Patented Dec. 11, 1923.

1,477,113

UNITED STATES PATENT OFFICE.

HARRY ESSEX AND ALGER L. WARD, OF WILMINGTON, DELAWARE, ASSIGNORS TO E. I. DU PONT DE NEMOURS & COMPANY, OF WILMINGTON, DELAWARE, A CORPORATION OF DELAWARE.

SYNTHESIS OF GLYCEROL.

No Drawing.   Application filed September 27, 1919.   Serial No. 326,913.

*To all whom it may concern:*

Be it known that we, HARRY ESSEX and ALGER L. WARD, citizens of the United States, and residents of Wilmington, in the county of New Castle, and State of Delaware, have invented a certain new and useful Synthesis of Glycerol, of which the following is a specification.

This invention relates to a process of making polyhydric, and especially trihydric, alcohols from chlorolefines, and in general to the conversion of chlorolefines into the corresponding dichlorhydrines. More particularly our invention relates to the synthesis of glycerol from allyl chloride.

One object of our invention is to provide an efficient and inexpensive process of synthesizing glycerol.

Another object of our invention is to provide an improved process of converting allyl chloride into glycerol dichlorhydrin by the chemical addition of hypochlorous acid, in order to render this reaction commercially feasible as a step in the manufacture of glycerol.

Previous attempts have been made to convert allyl chloride into glycerol by chemical addition of chlorine to allyl chloride to form 1, 2, 3-trichlorhydrin, and by subsequent hydrolysis of the 1, 2, 3-trichlorhydrin to glycerol, but difficulties encountered rendered the process impracticable.

To obviate these difficulties, it occurred to us that it might be possible to add hypochlorous acid to allyl chloride and hydrolyze the dichlorhydrins so produced to glycerol according to the equations—

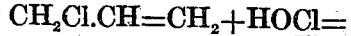
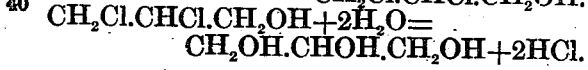

We discovered that dichlorhydrin could be hydrolyzed to glycerol much more easily than could trichlorhydrin. Hypochlorous acid, however, is an expensive reagent when prepared according to the ordinary methods, is very unstable, decomposing in the light and in the presence of salts and metals, and can only be kept in very dilute solution.

Several of the salts of hypochlorous acid are commercially available and in impure forms are purchasable at a low price, as sodium hypochlorite in "electrolytic bleach" (eau de labarraque) or calcium hypochlorite in "chloride of lime". Salts of hypochlorous acid are, however, in general poor sources for a solution of the free acid. If it is attempted to displace hypochlorous acid from its salts by the addition of a stronger acid it is found that the free hypochlorous acid liberated reacts with the remaining hypochlorite and with a velocity which is proportional to the square of the concentration of the free hypochlorous acid. In the case of sodium hypochlorite, the reactions are

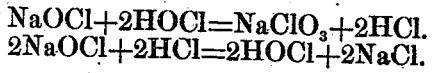

from which it is apparent that no matter how small the quantity of free acid present it is regenerated again and again and the above cycle of reactions proceeds until no hypochlorite remains. These reactions explain the well known and rapid "auto decomposition" of hypochlorite solutions which contain even small quantities of free hypochlorous acid.

In continuing our investigations we discovered that the hypochlorites may serve excellently as a source of hypochlorous acid for the aforesaid reaction with allyl chloride provided the operations are so conducted that both reactions, i. e., the liberation of hypochlorous acid and the addition of hypochlorous acid to allyl chloride, take place practically simultaneously. This we have effected in the following manner: An excess of allyl chloride is added to a water solution of a salt of hypochlorous acid and the mixture vigorously agitated. An acid, acid anhydrid, or solution of an acid salt is then added slowly to the mixture. Under these conditions the allyl chloride combines with the hypochlorous acid almost as fast as the latter is formed and the concentration of hypochlorous acid is kept so low that the loss resulting from the reaction—NaOCl+ 2HClO=NaClO₃+2HCl—is negligible.

The dichlorhydrins so produced remain in solution or, if insufficient water is present, may separate as a heavy oily liquid. Dichlorhydrins remaining in the solution may, if desired, be extracted with ether.

The second part of our invention lies in the discovery that the glycerine dichlorhydrins produced by the action of hypochlorous acid on allyl chloride and consisting principally of the isomer with the formula $CH_2Cl.CHCl.CH_2OH$, may be converted into glycerine with high yields (95% of the theoretical), and that the conversion is readily effected without isolating the dichlorhydrins from the reaction mixture. To accomplish this result it is merely necessary to heat the solution containing the dichlorhydrins with water, and a metallic oxide, hydroxide, carbonate or other substance to combine with the hydrochloric acid liberated. The reaction equation of the hydrolysis is—

$$CH_2Cl.CHCl.CH_2OH + 2H_2O = CH_2OH.CHOH.CH_2OH + 2HCl.$$

In an embodiment of these discoveries which appears particularly promising as a commercial procedure, allyl chloride, which is a liquid—boiling at about 46° C., is added in excess to a solution containing sodium hypochlorite and the mixture vigorously stirred. Carbon dioxide is then admitted to the mixed liquids, liberating hypochlorous acid according to the equation—

$$2NaOCl + CO_2 + H_2O = Na_2CO_3 + 2HOCl.$$

The allyl chloride reacts sufficiently rapidly with the free hypochlorous acid to keep its concentration so low that very little reaction with the sodium hypochlorite occurs. Carbon dioxide is passed in continuously until a test shows that no hypochlorites remain. If the allyl chloride was originally in excess the principal remaining products are allyl chloride, sodium carbonate or bicarbonate, water, and glycerol dichlorhydrins. To recover the excess allyl chloride from this mixture and convert the glycerol dichlorhydrins to glycerine it is merely necessary to heat. The allyl chloride is distilled off through a fractionating column and the dichlorhydrins are hydrolyzed to glycerine, the sodium carbonate assisting this reaction by removing the hydrochloric acid as it is formed. In some cases it may be desirable to add more sodium carbonate to the hydrolyzing solution to increase the yield of glycerine or the velocity of the hydrolysis.

The process may be illustrated more in detail by the following examples:—

I. 225 parts by weight of allyl chloride are added to 4000 parts of a solution containing 215 parts by weight of soduim hypochlorite. The reaction vessel is surrounded with ice and the contents stirred vigorously. Carbon dioxide gas is then bubbled through the liquid until a test shows only traces of hypochlorous acid. The flow of carbon dioxide is then discontinued and the stirring stopped. 400 parts of sodium carbonate are then added, the reaction vessel provided with a reflux condenser and the contents kept at boiling temperature for seven hours. About 1 part of allyl chloride may distill off during this period. The water solution remaining in the reaction vessel should contain, according to our experiments, about 200 parts of glycerine, a yield of 82% of the theoretical based on the allyl chloride used.

II. 225 pounds of allyl chloride are added to 220 pounds of sodium hypochlorite in water solution, the mixture vigorously stirred and carbon dioxide passed in until hypochlorites have nearly or completely disappeared. 156 pounds of sodium carbonate are then added and the temperature raised to boiling and kept there for several hours. If chlorates are absent the glycerin may be recovered by concentration and distillation. If chlorates are present they should be reduced, for obvious reasons, before it is attempted to recover the glycerine. The reactions are:—

$$2CH_2Cl.CH=CH_2 + 2NaOCl + CO_2 + H_2O = CH_2Cl.CHCl.CH_2OH + Na_2CO_3.$$
$$2CH_2Cl.CHCl.CH_2OH + 2Na_2CO_3 + 2H_2O = 2CH_2OH.CHOH.CH_2OH + 4NaCl + 2CO_2.$$

As indicated in the above examples, the proportions of sodium carbonate may vary widely, but should preferably be between about 150 and 400 parts for each 225 parts of allyl chloride used.

Our invention has been described with special reference to chloropropylene (allyl chloride) as the chlorolefine with which the process may be started, this constituting at the present time a valuable application of our invention; but it will be understood that other chlorolefines may be used such as chlorobutylenes, chloramylenes, etc. We have also discovered that instead of chloro-substituted olefines, there may be used other halolefines as bromopropylene, the use of the latter in the formation of 1-bromo-2 chlorhydrin having advantages for certain purposes not possessed by chloropropylene.

As further adaptations of the principles elucidated above, it may be mentioned that by analogous methods, hypobromous acid or hypoiodous acid may be added to halogen olefines to form polyhalohydrins and the resulting polyhalohydrins may be hydrolyzed to polyhydric alcohols. For example, hypobromous acid may be added to allyl bromide to form glycerol dibromhydrins and the glycerol dibromhydrins hydrolyzed to glycerine.

We claim:—

1. The process which comprises inducing a reaction between a halolefine and aqueous hypochlorous acid in the presence of an alkali-metal carbonate to form a mixture containing corresponding halogen-substituted chlorhydrins and said carbonate, and heating said mixture until said halogen-substituted chlorhydrins have been hydrolyzed to polyhydric alcohols.

2. The process which comprises inducing a reaction between a chlorolefine and aqueous hypochlorous acid in the presence of an alkali-metal carbonate to form a mixture containing dichlorhydrins and said carbonate, and heating said mixture until said dichlorhydrins become hydrolyzed to trihydric alcohols.

3. The process which comprises agitating a mixture of a chlorolefine and a water solution of alkali metal hypochlorite while gradually adding thereto a substance capable of reacting with said hypochlorite to form hypochlorous acid and an alkali-metal salt until substantially all of the chlorolefine present has been converted by the hypochlorous acid into the corresponding polychlorhydrin, and then heating the resulting mixture in the presence of an agent capable of accelerating hydrolysis until said polychlorhydrin becomes hydrolyzed to a polyhydric alcohol.

4. The process which comprises agitating a mixture of a chlorolefine and a water solution of a hypochlorite while adding carbon dioxide thereto to form hypochlorous acid at such a rate that said hypochlorous acid becomes combined with the chlorolefine about as fast as it is formed, and then heating the resulting polychlorhydrin in the presence of water and carbonate formed during the preceding step until said polychlorhydrin becomes hydrolyzed to a polyhydric alcohol.

5. The process which comprises agitating a mixture of a chlorolefine and a water solution of sodium hypochlorite while adding carbon dioxide thereto to form hypochlorous acid at such a rate that said hypochlorous acid becomes combined with the chlorolefine about as fast as it is formed, and then heating the resulting polychlorhydrin in the presence of water and sodium carbonate formed during the preceding step until said polychlorhydrin becomes hydrolyzed to a polyhydric alcohol.

6. The process which comprises inducing a reaction between an allyl halide and aqueous hypochlorous acid to form a mixture containing corresponding halogen-substituted chlorhydrins, and heating said mixture until said halogen-substituted chlorhydrins have been hydrolyzed to glycerol.

7. The process which comprises inducing a reaction between allyl chloride and aqueous hypochlorous acid to form a mixture containing dichlorhydrins, and heating said mixture until said dichlorhydrins become hydrolyzed to glycerol.

8. The process which comprises agitating a mixture of allyl chloride and a water solution of a hypochlorite while gradually adding thereto a substance capable of reacting with said hypochlorite to form hypochlorous acid until substantially all of the allyl chloride present has been converted by the hypochlorous acid into dichlorhydrin, and then heating the resulting mixture in the presence of an agent capable of accelerating hydrolysis until said dichlorhydrin becomes hydrolyzed to glycerol.

9. The process which comprises agitating a mixture of allyl chloride and a water solution of a hypochlorite while adding carbon dioxide thereto to form hypochlorous acid at such a rate that said acid becomes combined with the allyl chloride about as fast as it is formed, and then heating the resulting dichlorhydrin in the presence of water and carbonate formed during the preceding step until said dichlorhydrin becomes hydrolyzed to glycerol.

10. The process which comprises agitating a mixture of allyl chloride and a water solution of sodium hypochlorite while adding carbon dioxide thereto to form hypochlorous acid at such a rate that said acid becomes combined with the allyl chloride about as fast as it is formed, and then heating the resulting dichlorhydrin in the presence of water and sodium carbonate until said dichlorhydrin becomes hydrolyzed to glycerol.

11. The process of producing glycerol which comprises cooling and vigorously stirring a mixture of 225 parts of allyl chloride and about 4000 parts of water solution containing from about 215 to 220 parts of sodium hypochlorite, while passing carbon dioxide thereinto until a test shows only a small percentage of hypochlorous acid, then adding from about 150 to 400 parts of sodium carbonate, heating the resulting mixture containing dichlorhydrins at about a boiling temperature to hydrolize the dichlorhydrins to glycerol while distilling off any unchanged allyl chloride, and then removing salts which are present.

12. The process of producing glycerol which comprises heating a glycerol dichlorhydrin in the presence of both water and a substance capable of promoting hydrolysis of said dichlorhydrin.

13. The process of producing glycerol which comprises heating a glycerol dichlorhydrin in the presence of both water and an alkali-forming metal carbonate.

14. The process of producing glycerol which comprises heating at about the boiling temperature a water solution of glycerol dichlorhydrins and sodium carbonate until hydrolysis of the dichlorhydrins is substantially complete.

15. The process which comprises agitating a mixture of a halolefine and a water solution of a salt of a hypohalous acid while gradually adding thereto a substance capable of reacting with said salt to form hypohalous acid until substantially all of the halolefine present has been converted by the hypohalous acid into the corresponding polyhalohydrins, and then heating the resulting mixture in the presence of an agent capable of accelerating hydrolysis until said polyhalohydrins become hydrolyzed to a polyhydric alcohol.

16. The process which comprises agitating a mixture of a halolefine and a water solution of a salt of a hypohalous acid while adding carbon dioxide thereto to form hypohalous acid at such a rate that said hypohalous acid becomes combined, about as fast as it is formed, with said halolefine, and then heating the resulting polyhalohydrins in the presence of water and of carbonate formed during the preceding step until said polyhalohydrins becomes hydrolyzed to a polyhydric alcohol.

In testimony whereof we affix our signatures.

HARRY ESSEX.
ALGER L. WARD.